(12) United States Patent
Avital et al.

(10) Patent No.: US 11,223,299 B2
(45) Date of Patent: Jan. 11, 2022

(54) HIGH PERFORMANCE PIEZOELECTRIC MOTOR

(71) Applicant: NANOMOTION LTD., Yokneam (IL)

(72) Inventors: Alon Avital, Haifa (IL); Nir Karasikov, Haifa (IL); Roman Yasinov, Hadera (IL); Gal Peled, Kibbutz ein Hahoresh (IL)

(73) Assignee: Nanomotion Ltd., Yokneam (IL)

( * ) Notice: Subject to any disclaimer, the term of this patent is extended or adjusted under 35 U.S.C. 154(b) by 169 days.

(21) Appl. No.: 16/783,829

(22) Filed: Feb. 6, 2020

(65) Prior Publication Data

US 2021/0249973 A1    Aug. 12, 2021

(51) Int. Cl.
   *H02N 2/02*    (2006.01)
(52) U.S. Cl.
   CPC ............ *H02N 2/026* (2013.01); *H02N 2/028* (2013.01)
(58) Field of Classification Search
   CPC ........ H02N 2/026; H02N 2/028; H02N 2/004; H02N 2/0055; H02N 2/006
   See application file for complete search history.

(56) References Cited

U.S. PATENT DOCUMENTS 5,907,211 A * 5/1999 Hall ...................... H02N 2/043
                                                    310/328

\* cited by examiner

*Primary Examiner* — Emily P Pham
(74) *Attorney, Agent, or Firm* — William H. Dippert; Laurence A. Greenberg; Werner H. Sterner

(57) ABSTRACT

A piezoelectric motor comprises a frame having a first frame side and a second frame side; a first actuator assembly and a second actuator assembly. The first actuator assembly comprises a first piezoelectric actuator and two rollers, each of the rollers is pressed between the first piezoelectric actuator and the first frame side. The second actuator assembly comprises a second piezoelectric actuator and two rollers, each of the rollers is pressed between the second piezoelectric actuator and the second frame side. The motor further comprises at least one pre-loaded spring provided between the first actuator assembly and the second actuator assembly, pushing the first actuator assembly and the second actuator assembly against the first frame side and the second frame side, respectively.

9 Claims, 5 Drawing Sheets

HIGH PERFORMANCE PIEZOELECTRIC MOTOR

TECHNICAL FIELD

The present disclosed subject matter relates to a high performance piezoelectric motor. More particularly, the present disclosed subject matter relates to a symmetrical construction of a piezoelectric motor.

BACKGROUND

U.S. Pat. No. 5,777,423 to Zumeris, titled "Ceramic Motor", which is incorporated in its entirety by reference into the specification, discloses a paired piezoelectric micromotor for providing motion relative to a body, including two rectangular piezoelectric plates, each piezoelectric plate having first and second long edges, first and second short edges, front and back faces, electrodes attached to the front and back faces thereof and a ceramic spacer attached to the first long edge, the ceramic spacer engaging a surface of the body. The first short edge of the first plate is adjacent and substantially parallel to the first short edge of the second plate. Resilient force is applied to a portion of each plate, pressing the ceramic spacer against the surface of the body. A voltage source electrifies at least some of the electrodes with an excitation voltage.

U.S. Pat. No. 7,183,690, to Shiv et al., titled "Resonance Shifting", discloses a piezoelectric vibrator comprising: a thin rectangular piezoelectric plate having two short edge surfaces and two long edge surfaces and two large planar face surfaces which plate has transverse resonant vibration modes parallel to its short edges and longitudinal resonant vibration modes parallel to its long edges.

The paper titled "Performance and Applications of L1B2 Ultrasonic Motors", authored by Gal Peled, Roman Yasinov, and Nir Karasikov; and published on 1 Jun. 2016 in Actuators 2016, 5, 15; doi:10.3390/act5020015; discloses some detail of piezoelectric motors and their operation.

BRIEF SUMMARY

According to a first aspect of the present disclosed subject matter, a piezoelectric motor is provided comprising: a frame having a first frame side and a second frame side; a first actuator assembly and a second actuator assembly wherein: the first actuator assembly comprising: a first piezoelectric actuator; and two rollers, each of the rollers are pressed between the first piezoelectric actuators and the first frame side the second actuator assembly comprising: a second piezoelectric actuator; and two rollers, each of the rollers is pressed between the second piezoelectric actuator and the second frame side, and at least one pre-loaded spring, provided between the first actuator assembly and the second actuator assembly, pushing the first actuator assembly and the second actuator assembly against the first frame side and the second frame side, respectively.

In some embodiments each of the rollers is positioned in an indentation in a corresponding frame side.

In some embodiments each of the first and the second actuator assemblies further comprising a contact plate that is affixed to a corresponding piezoelectric actuator, such that each of the rollers can roll between the contact plate and the corresponding frame side.

In some embodiments each of the first and second actuator assemblies further comprising a cushioning member located between the contact plate the corresponding piezoelectric actuator.

In some embodiments the frame sides, the rollers and the contact plates are made of metal.

In some embodiments the rollers are cylindrical.

In some embodiments the first piezoelectric actuator and the second piezoelectric actuator push a load in the X direction, normal to the direction Y defined by the rolling direction of the rollers, and wherein the stiffness of the piezoelectric motor in respect to the frame is much higher in the X direction than in the Y direction.

In some embodiments the high stiffness of the piezoelectric motor in respect to the frame in the X direction is determined by the stiffness of the metallic frame, the rollers and the contact plates.

In some embodiments the first piezoelectric actuator and the second piezoelectric actuator are pushed in the Y direction against the load by at least one spring loaded support, and wherein the low stiffness of the piezoelectric motor in respect to the frame in the Y direction is determined by the stiffness of the spring loaded support.

It is another aspect the present disclosed subject matter to assure low stiffness and low losses associated with motion of the piezoelectric actuator in Y direction (perpendicular to motion direction) and provide high stiffness in X direction (motion direction). All for a piezoelectric motor, where the piezoelectric material itself is brittle and should not be affected by the high structure stiffness.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

The features as indicated above can be combined individually or all together.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Figure 1:
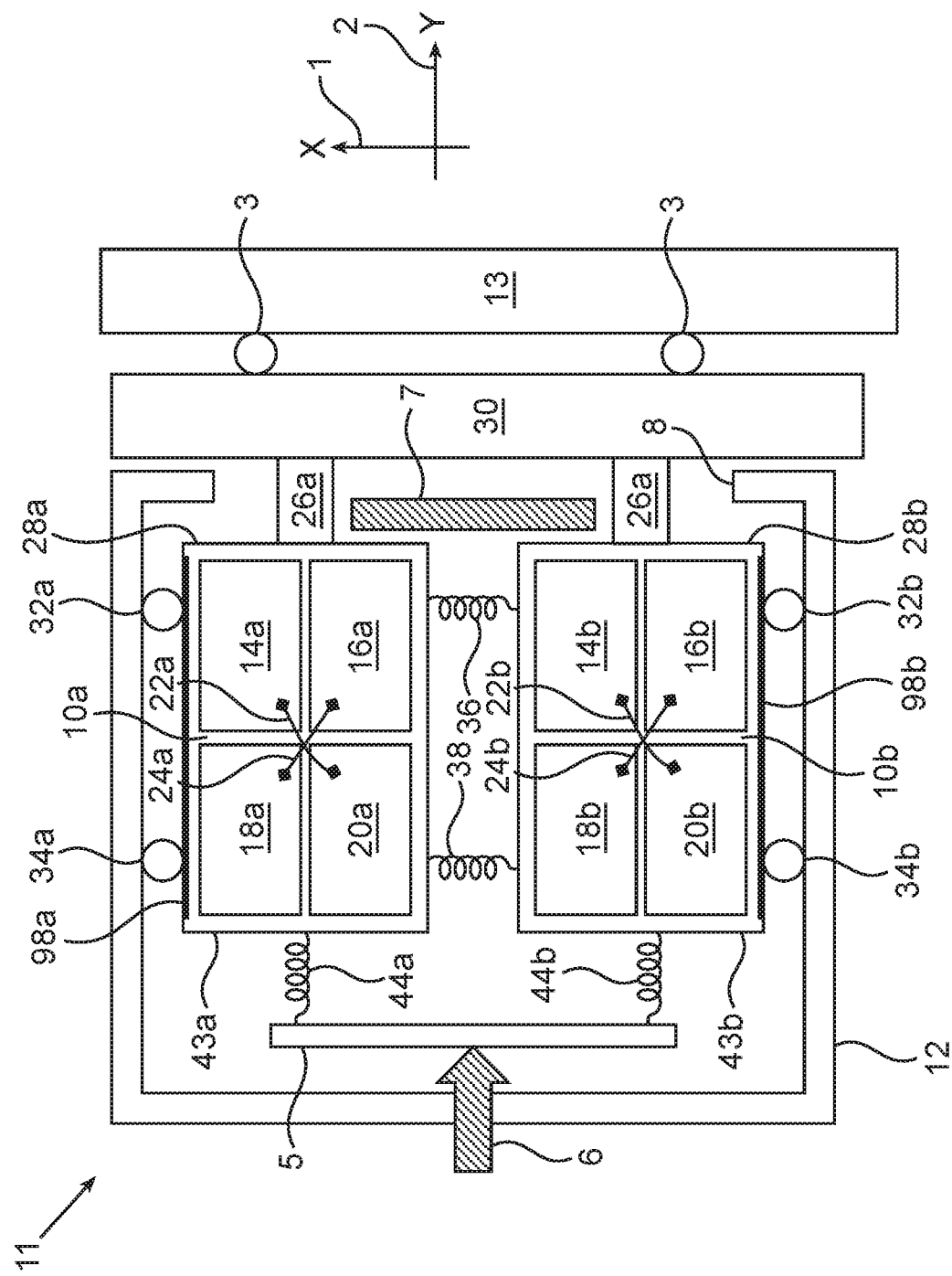
FIG. 1 schematically illustrates a top view of a piezoelectric motor with covers removed, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

In discussion of the various figures described herein below, like numbers refer to like parts. Specifically, a numeral followed by a letter such as "a" or "b" may mark symmetrical elements. So as to not clutter the text, a numeral followed by the letter "x" will refer to any of the letters that follow that numeral in the drawing, for example, 10x can stand for any of 10a and 10b, etc.

Referring now to FIG. 1 schematically illustrating a top view of a piezoelectric motor with covers removed, in accordance with some exemplary embodiments of the disclosed subject matter. A piezoelectric motor 11 having a frame 12 that houses two piezoelectric actuators 10a and 10b in a substantially symmetrical configuration. FIG. 1 shows for each actuator, one large face of a relatively thin rectangular piezoelectric ceramic actuator 10x (x stands for either a or b) for use in a motor in accordance with a preferred embodiment of the invention.

Optionally, a medium to hard stiffness piezoelectric material with medium to high quality factor is used for ceramic actuator 10x, This and other optional features provide slightly higher operational frequencies per piezo element length and better performance, such as higher mechanical power output to weight ratio and higher efficiency.

In the exemplary, non-limiting embodiment, four electrodes 14x, 16x, 18x and 20x are plated or otherwise attached onto the face (hereinafter, "the first face") of the piezoelectric ceramic actuator 10x to form a checkerboard pattern of rectangles, each substantially covering one-quarter of the first face. The opposite face of the piezoelectric ceramic (hereinafter "the second face") is preferably substantially fully covered with a single electrode (not shown). Diagonally located electrodes (14x and 20x; 16x and 18x) are electrically connected by wires 22x and 24x. Alternatively, the electrodes can be connected by printed circuit techniques. The electrode on the second face is preferably grounded or floating. A spacer (Hard ceramic tip) 26x is attached, for example, bonded with adhesive, to a short edge 28x of piezoelectric ceramic actuator 10x, preferably at the center of the short edge 28x. Alternatively, spacer or tip 26x may be a part of the piezoelectric ceramic actuator 10x.

Piezoelectric ceramic actuator 10x has a large number of resonances. In particular, the dimensions of piezoelectric ceramic actuator 10x are chosen such that resonances for Dx and Dy are closely spaced, have overlapping excitation curves and appropriate phase shift between them (preferably 90 degrees), wherein Dx and Dy are motions in the two directions X and Y indicated by the corresponding arrows 1 and 2. In particular, the resonances that may be used in accordance with embodiments of the disclosed subject matter are a one-half (½) mode resonance L1 for Dy and a one and one-half (1.5) mode resonance B2 for Dx. However, other resonances can be used, depending on the dimensions of ceramic actuator 10x.

When piezoelectric ceramic actuator 10x is excited by a frequency within the resonance band, both the Dx and Dy resonances will be excited in a phase shift of preferably 90 degrees. This excitation causes typically elliptical motion of the spacer 26x and force excreted by spacers 26x on load or body 30 that is pressed against spacers 26x by force of a spring loaded support 44x on elements 10x. Surface of load 30 is shown as being straight and can move relative to an external structure 13, by sliding over it or rolling over load rollers 3 or other types of low friction, high stiffness, bearings. Alternatively, surface of load 30 may be curved, such as the surface of a cylinder or a section of a cylinder that is to be rotated. It should be noted that load 30 may be stationary while motor 11 moves in respect to it.

In this exemplary embodiment, both piezoelectric ceramics 10a and 10b are constrained from movement by two pair of rollers: 32a and 34a, 32b and 34b, respectively, that are pressed against the frame 12 by force of the two spring loaded supports 36 and 38.

Rollers 34x and 32x are designed to slide in the Y direction with low friction, yet provide high stiffness in respect to movements in the X axis, in both directions (−X and +X), while reducing the mechanical losses. Preferably, rollers 32x and 34x as well as the surfaces the rollers roll on, are made of hard materials such as metal or ceramics, and are smoothly polished. Such arrangement may provide better stiffness than using levers or resilient holders. Such arrangement may also provide better and lower loss than using sliding support, or fixed support (as it is difficult to avoid any motion in the Y direction at the point of support, due to non-perfect straightness of 30).

Preferably, rollers 34x and 32x do not rest directly on the piezo ceramic material of actuators 10x. Instead, contact plates 98a and 98b are attached to ceramic material actuators 10a and 10b, respectively, as will be seen in more details in FIGS. 2A-B. Contact plates 98x are optionally multi-layered plates having a hard, preferably metallic layer in contact with the rollers, and a softer, preferably plastic layer acting as a cushion to prevent damage to the brittle ceramic plate 10x.

Spring loaded supports 36 and 38 preferably comprise compressed metallic springs. Two coil springs may be used, but one or more springs may be used. Other shapes of springs, such as leaf springs may be used. Use of metallic spring may be superior to using resilient material such as silicon rubber, as it may provide better control of the force and requires looser tolerance; it may have lower mechanical losses, and also lower outgassing; thus, better suitable for high vacuum applications. These springs provide constant force, larger than the motor effective force and hence maintain rollers 32x and 34x at contact with both frame 12 and the contact plates, and thus their deformation determine the lateral stiffness in the X direction.

Spacers 26x are pressed against load 30 by spring loaded back supports 44x. Spring loaded supports 44x are preferably pressed against the middle of a second short edge 43x of the piezoelectric ceramic actuator 10x opposite short edge 28x. Back support 44x preload supplies pressure between spacer 26x and load 30 that causes the motion of spacer 26x to be transmitted to load 30. Preferably this spring has a low spring coefficient so non straightness of strip 30 will not affect the motor's preload force.

It should be understood that due to low spring coefficient, spring loaded back support 44x has a much slower time response than a cycle of the frequency at which piezoelectric ceramic actuator 10x is excited. Thus, the face of spacer 26x, which is pressed against load 30, slightly moves away and to the side from the load 30 during part of the piezo excitation cycle and when ceramic actuator 10x contracts and its end 28x via 26x shifts load 30 to the other side. In the force inducing part of the cycle, spacer 26x is pressed onto body 30 when ceramic actuator 10x expands and its end 28x shifts to the opposite direction, causing motion or force to be applied to load 30. The paper and patents cited in the background section, and incorporated herein by reference; provide more details regarding the motion and deformation of ceramic actuators used in piezoelectric motors.

Spring loaded back supports 44x preferably comprise compressed metallic springs having low spring constant. A coil spring can be used, but more spring types may be used. Other shapes of springs, such as leaf springs can be used. Use of metallic spring may be superior to using resilient material such as silicon rubber as it may provide better control of the force; it may have less mechanical losses, and also lower outgassing; thus, better suitable for high vacuum applications. Spring having lower spring coefficient will be more forgiving to mechanical tolerances of straightness of motion.

Spring loaded back supports 44x can rest directly on frame 12, or can rest against back plate 5, as shown in the figure. The compression of spring loaded back supports 44x is optionally adjustable by mechanical adjustment 6 that can be a screw or other means of adjustment for adjusting the distance between the frame 12 and back plate 5. A single adjustment can be used. Alternatively, compression in each back supports 44x is optionally individually adjusted by using two adjustments between the frame 12 and back plate 5. Yet alternatively, compression in each one of the back supports 44x is optionally and individually adjusted by using a corresponding individual adjustment between the frame 12 and the back plate 5.

To facilitate transport of motor 11 and to ease its installation, a push-back plate 7 is optionally located in front of ceramic actuator 10x. When the push-back plate 7 is pushed in the direction −Y by a retraction mechanism (not seen here), it further compresses back supports 44x such that the ends of spacers 26x protrude through opening 8 of frame 12 just to touch load 30. After motor 11 is installed, the push-back plate 7 is released (as illustrated in the figure) while allowing spacers 26x to be pressed against load 30. Optionally, push-back plate 7 can be reused when motor 11 has to be released, replaced or serviced.

Figure 2A:
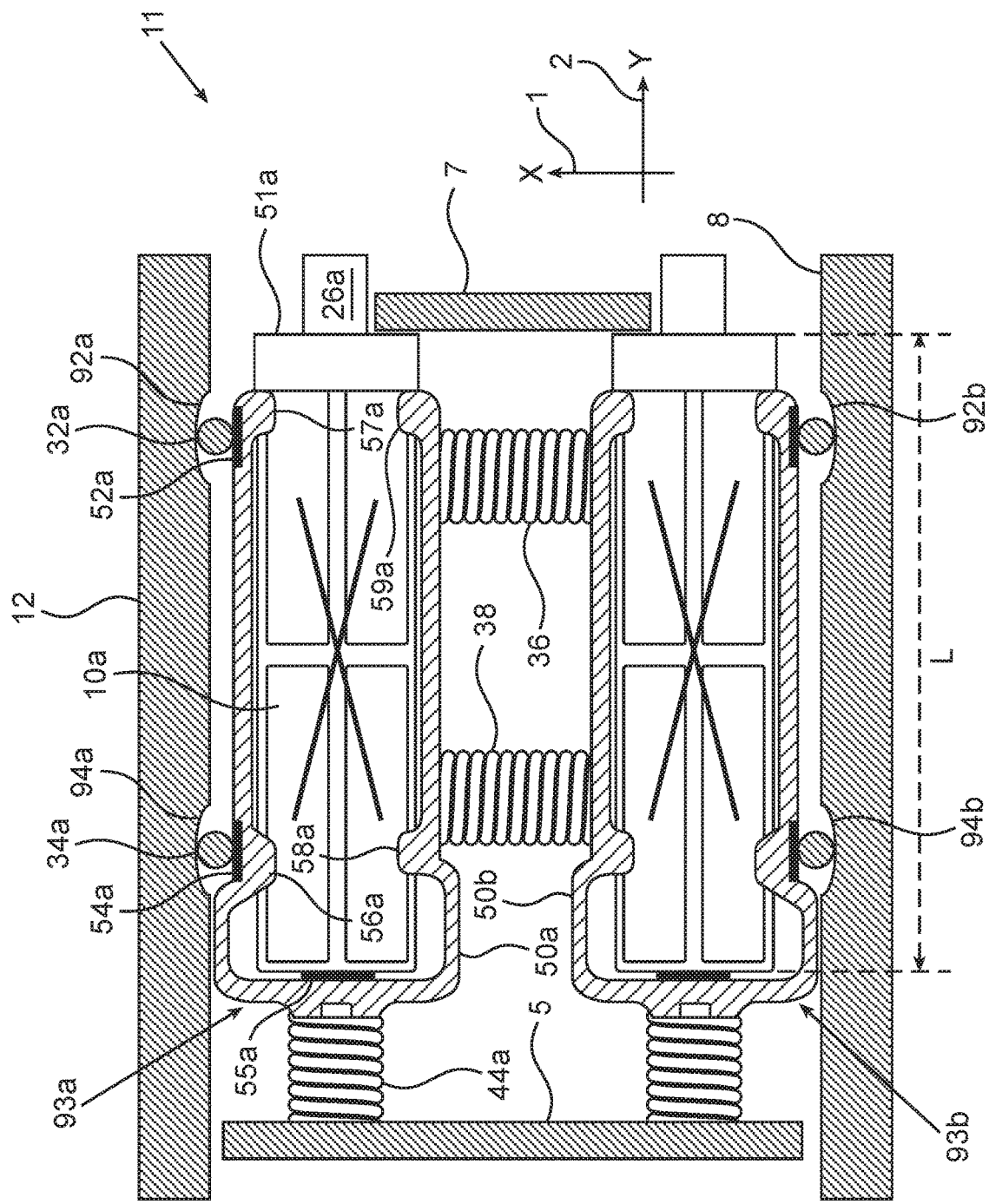
FIG. 2A schematically illustrates some more details of the piezoelectric motor shown in FIG. 1, in accordance with some exemplary embodiments of the disclosed subject matter.

Referring now to FIG. 2A, schematically illustrating some more details of the piezoelectric motor, in accordance with some exemplary embodiments of the disclosed subject matter.

Only elements of FIG. 2A that were not already explained in the text are discussed herein. Some elements on the lower half of motor 11, are not marked herein to reduce figure cluttering. The figure schematically illustrates a top view of motor 11 with its covers off. Motor 11 comprises two assemblies 93a and 93b in a symmetric configuration.

In this figure, push-back plate 7 is pushed in the direction −Y (the Y axis is indicated by numeral 2) by a retraction mechanism (not seen here) such that the ends of spacers 26x optionally just marginally protrude through opening 8 of frame 12 so they just touch load 30 (not seen in this figure). Thus, in this retracted position, the spacers 26x protrude so as to touch the hard ceramic load 30 with zero force, allowing easy installation of motor 11 into its desired location and removal of the motor 11, for example for service or replacement.

Seen here is the holder 50a holding the ceramic actuator 10a at holding points 56a, 57a, 58a and 59a. The locations of holding points 56a, 57a, 58a and 59a are selected to be at or near the inflexion (Nodal) points of the resonances excited in ceramic actuator 10a, where the heat generation is large, and thus heat can be removed by conduction from ceramic actuator 10a via holder 50a. Additionally, at the inflection points of the resonance excited in ceramic actuator 10a, the motion in the X direction is minimal or zero, thus the forces and rolling motion of holder 50a in respect to rollers 34a and 32a are predominately or only in the Y direction. Heat may also dissipate via spacer 26x, and by radiation. As this motor is optionally vacuum compatible (may be made to avoid the use of lubricants), heat dissipation by air convection may not be available.

In the depicted non limiting example seen in FIG. 2A, the locations of the holding points 57x and 59x are typically at 0.13 L and the locations of the holding points 56x and 58x are typically at 0.87 L, where L is the length of the actuator 10x measured from the tip side 51x. In a non-limiting exemplary embodiment, the ceramic actuator 10x is about 28.8 mm in length and 7.7 mm wide. However, other dimensions are possible, maintaining the L1 and B2 resonances in proximity.

Optional damper 55a, situated between ceramic actuator 10a and the back of holder 50a, protects the brittle ceramics 10a. Damper 55a is preferably made of resilient material such as Viton elastomer.

Figure 2B:
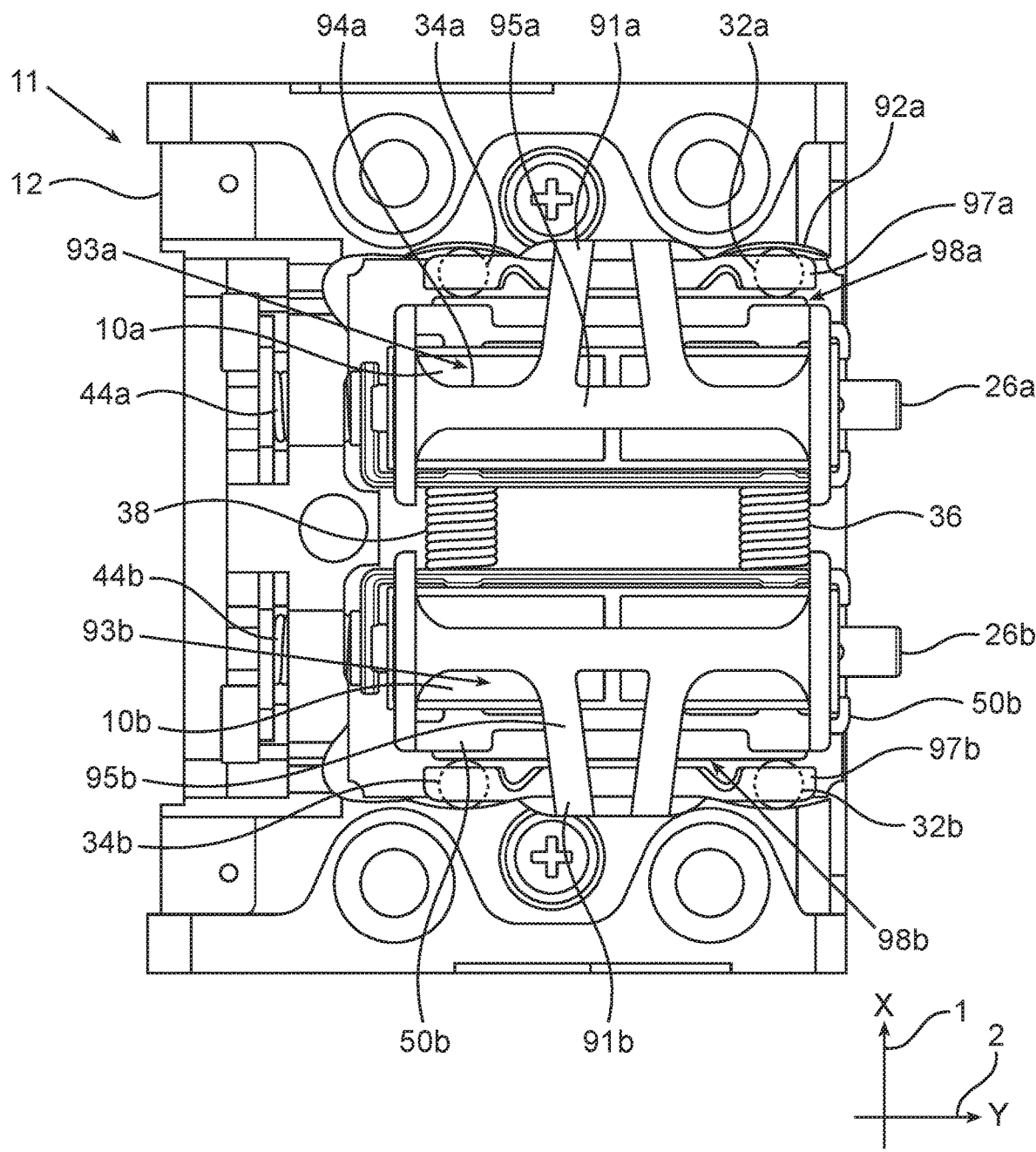
FIG. 2B schematically illustrates some more details of the piezoelectric motor shown in FIG. 1, in accordance with some exemplary embodiments of the disclosed subject matter.

Optional contact plates 54a and 52a are placed on holder 50a to provide hard and smooth surface for rollers 34a and 32a to roll over. Contact plate 54a and 52a can be made of metal such as steel, aluminum, a combination or the like, while holder 50a can be made of plastic or metal. This reduces Hertzian stress and improves stiffness in X direction. Optionally, a damper layer (not seen here) is placed between the metallic contact plate and the holder 50a. In some embodiments, contact plates 54a and 52a are united to a single plate as seen in FIGS. 1 and 2B. Optional indentations 94x and 92x in frame 12 are provided, each configured to accept rollers 34x and 32x, respectively. Preferably, the indentations have a radius of curvature larger than the radius of the corresponding roller. The indentations keep the rollers 43x and 34x aligned in their desired location. Additionally, the curvature of the indentation increases the contact area between the roller and the frame, thus increasing the stiffness of the structure in the X direction 1. However, for small motions, such as experienced during the operation of motor 11, the rollers 34x and 32x can almost freely role between frame 12 and contact plate 54x and 52x, allowing low friction motion of ceramic actuator 10x in the Y direction 2. Preferably, the rollers have cylindrical shape. This increases stiffness relative to spherical shapes while maintaining low coefficient of friction. The indentation can have cylindrical shape, but other concave shapes may be used without limiting the scope of the disclosed subject matter.

Optionally, concave shapes can be used in contact plates 54x and 52x, or on both contact plates 54x and 52x and frame 12.

Referring now to FIG. 2B schematically illustrating some more details of the piezoelectric motor, in accordance with some exemplary embodiments of the disclosed subject matter. A top view of motor 11 and its covers is shown.

Rollers 32x and 34x rest respectively against indentations 92x and 94x in frame 12 on one side, and against contact plate 98x on the other side.

Roller 32a is seen here partially behind roller carriage 97a. The part of roller 32a, which is behind cover 97a, is demonstrated in dashed line. Roller carriages 97x hold the rollers so as to prevent movement in the Z direction that is normal to direction X (1) and Y (2).

Also seen in this figure are covers 95a and 95b respectively, holding motors 10a and 10b to frame 12 and preventing motion of assembly 93x in the Z direction, while allowing the motor to freely vibrate in the X-Y plane. Covers 95x are secured to frame 12 by wings 91x.

Figure 2C:
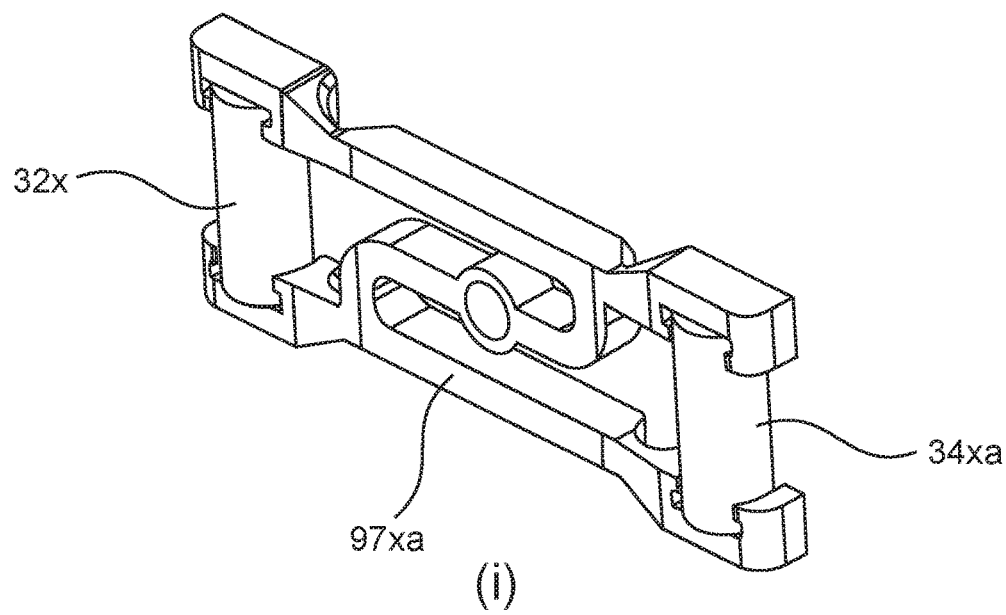
FIG. 2C schematically illustrates some components of a piezoelectric motor, in accordance with some exemplary embodiments of the disclosed subject matter.
Figure 2C:
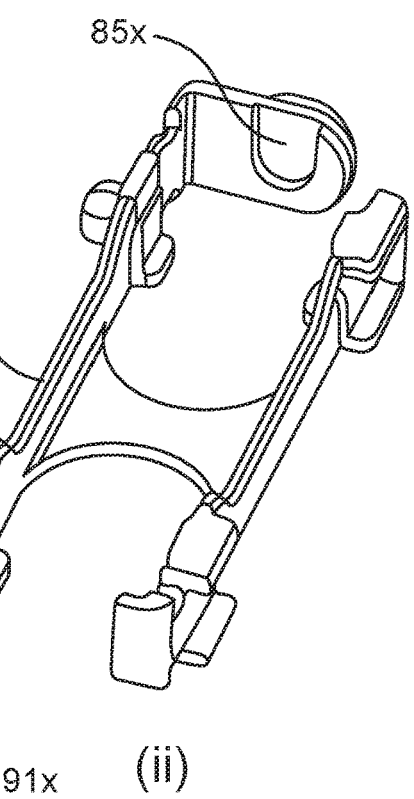
Figure 2C:
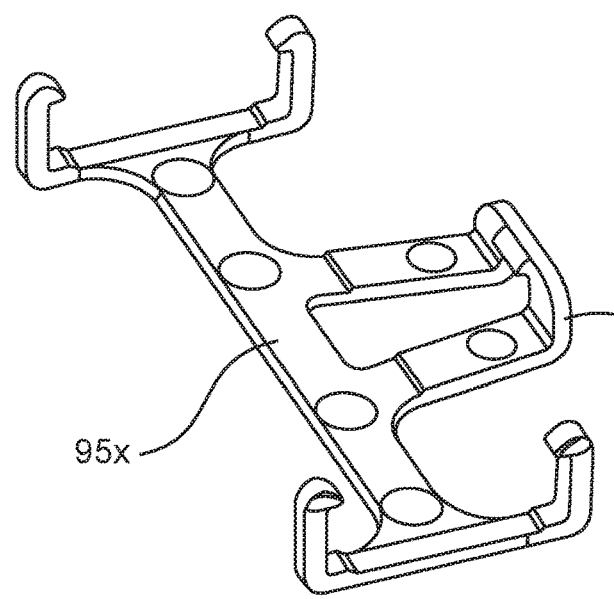

Referring now to FIG. 2C schematically illustrating some components of a piezoelectric motor, in accordance with some exemplary embodiments of the disclosed subject matter:

(i) illustrates the rollers 32x and 34x in roller carriage 97a.
(ii) illustrates the holder 50x showing bay 85x for holding damper 55x.
(iii) illustrates the a cover 95x showing wing 91x.

Figure 3A:
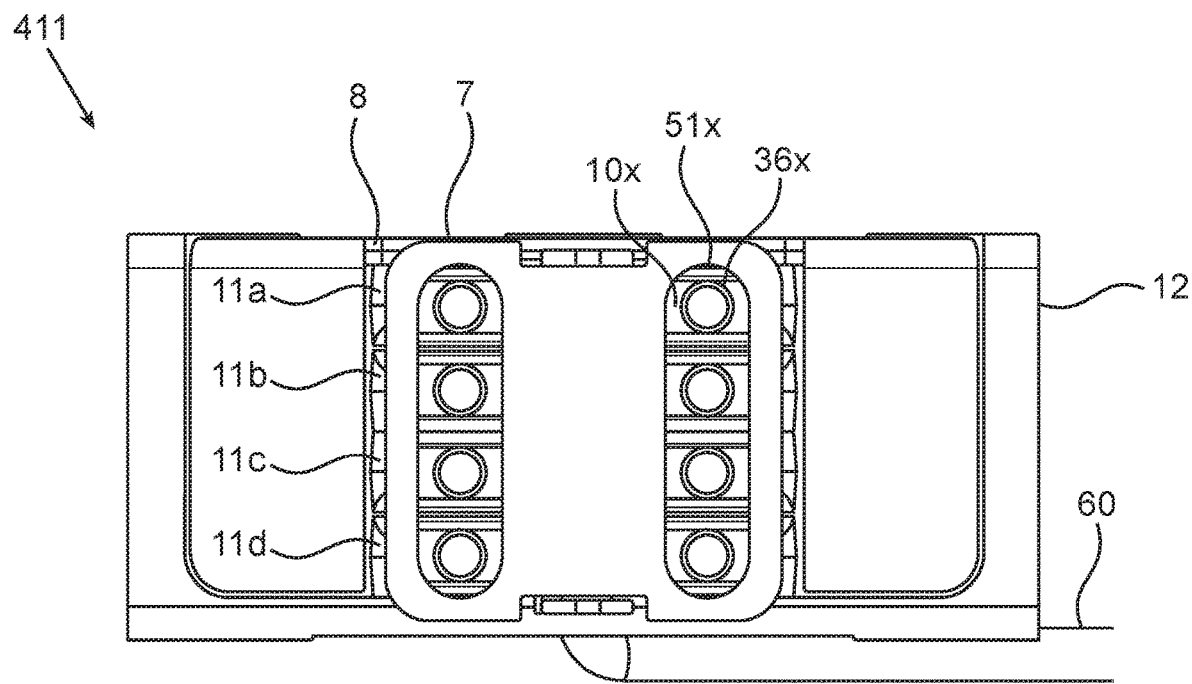
FIG. 3A schematically illustrates a front view of the piezoelectric motor assembly comprising a stack of four piezoelectric pairs motors, in accordance with some exemplary embodiments of the disclosed subject matter.

Referring now to FIG. 3A schematically illustrating a front view of the piezoelectric motor assembly comprising 2 stacks of four piezoelectric motors, in accordance with some exemplary embodiments of the disclosed subject matter.

FIG. 3A schematically illustrates a front view of the piezoelectric motor assembly 411 comprising two stacks of four piezoelectric motors 11a-d. The piezoelectric motor assembly is secured to the motorized device, for example, by connecting member 60.

Figure 3B:
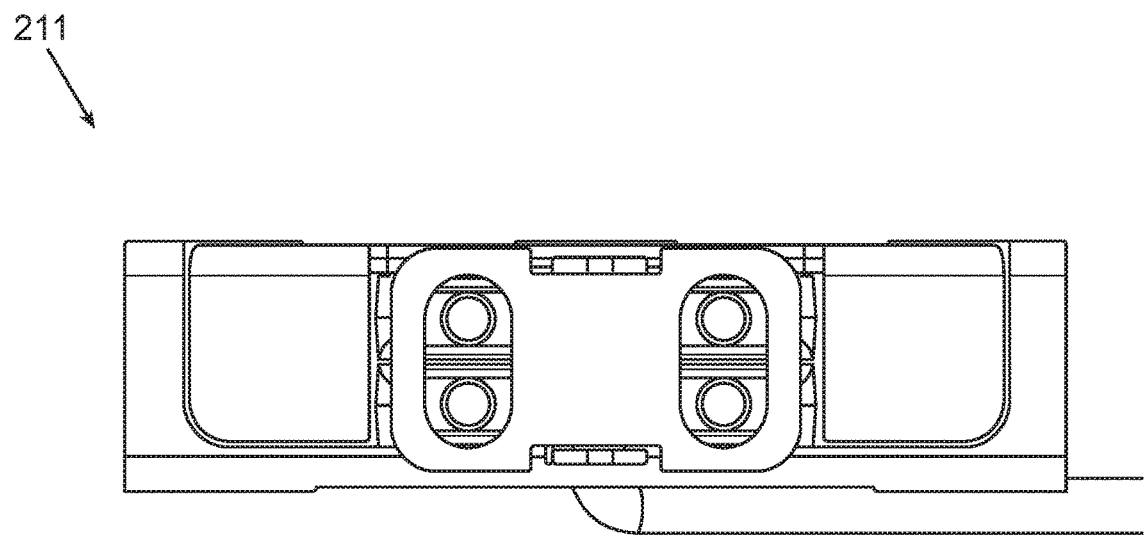
FIG. 3B schematically illustrates a front view of the piezoelectric motor assembly comprising a stack of two piezoelectric pairs motors, in accordance with some exemplary embodiments of the disclosed subject matter.

Referring now to FIG. 3B schematically illustrating a front view of the piezoelectric motor assembly comprising two stacks of piezoelectric motors, in accordance with some exemplary embodiments of the disclosed subject matter. It should be noted that piezoelectric motor assemblies with different number of piezoelectric motors can be made, optionally with other assembly configurations such as in a 2D matrix. For example a single motor assembly 11x may be used or a stack of N motor assemblies 11x may be used, wherein N is an integer number. Optionally, motor assemblies 11x may not be aligned exactly one above the other.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A piezoelectric motor comprising:
   a frame having a first frame side and a second frame side;
   a first actuator assembly and a second actuator assembly wherein:
      said first actuator assembly comprising:
         a first piezoelectric actuator; and
         two rollers, each of the rollers is pressed between the first piezoelectric actuator and the first frame side;
      said second actuator assembly comprising:
         a second piezoelectric actuator; and
         two rollers, each of the rollers is pressed between said second piezoelectric actuator and said second frame side, and
   at least one pre-loaded spring provided between said first actuator assembly and said second actuator assembly, pushing said first actuator assembly and said second actuator assembly against said first frame side and said second frame side, respectively.

2. The piezoelectric motor of claim 1, wherein each of the rollers is positioned in an indentation in a corresponding frame side.

3. The piezoelectric motor of claim 1, wherein each of the first actuator assembly and the second actuator assembly further comprising a contact plate that is affixed to a corresponding piezoelectric actuator, such that each of the rollers can roll between said contact plate and a corresponding frame side.

4. The piezoelectric motor of claim 3, wherein each of the first actuator assembly and the second actuator assembly further comprising a cushioning member located between the contact plate and the corresponding piezoelectric actuator.

5. The piezoelectric motor of claim 3, wherein the first frame side, the second frame side, the rollers and said contact plates are made of metal.

6. The piezoelectric motor of claim 3, wherein the rollers are cylindrical.

7. The piezoelectric motor of claim 5, wherein:
said first piezoelectric actuator and said second piezoelectric actuator push a load in an X direction, normal to a Y di; defined by a rolling direction of the rollers,
and wherein the stiffness of the piezoelectric motor in respect to said frame is much higher in the X direction than in the Y direction.

8. The piezoelectric motor of claim 7, wherein the high stiffness of the piezoelectric motor in respect to said frame in the X direction is determined by the stiffness of said frame, said rollers and said contact plates.

9. The piezoelectric motor of claim 7, wherein:
said first piezoelectric actuator and said second piezoelectric actuator are pushed in the Y direction against said load by at least one spring loaded support,
and wherein the low stiffness of the piezoelectric motor in respect to said frame in the Y direction is determined by the stiffness of said at least one spring loaded support.

* * * * *